United States Patent
Kobayashi

(10) Patent No.: US 7,330,637 B2
(45) Date of Patent: Feb. 12, 2008

(54) RECORDING DEVICE

(75) Inventor: Kenji Kobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 623 days.

(21) Appl. No.: 10/845,525

(22) Filed: May 14, 2004

(65) Prior Publication Data

US 2005/0196129 A1  Sep. 8, 2005

(30) Foreign Application Priority Data

Mar. 8, 2004 (JP) ............................. 2004-063397

(51) Int. Cl.
*H04N 5/91* (2006.01)
*H04N 5/00* (2006.01)

(52) U.S. Cl. ........................................ 386/46; 386/125

(58) Field of Classification Search ................. 386/46, 386/111, 125–126, 95, 83, 117, 92, 56
See application file for complete search history.

(56) References Cited

U.S. PATENT DOCUMENTS

2003/0152359 A1 * 8/2003 Kim ............................. 386/46

FOREIGN PATENT DOCUMENTS

JP          6-250794          9/1994

* cited by examiner

*Primary Examiner*—Thai Q. Tran
*Assistant Examiner*—Tat Chi Chio
(74) *Attorney, Agent, or Firm*—McDermott Will & Emery LLP

(57) ABSTRACT

The present invention prevents a recording failure that may arise out of insufficient free disk space in a hard disk based video recorder. If disk space insufficiency occurs in a redundant recording device or video recorder that is equipped with a redundant hard disk array to provide against failure, the nonredundant mode is temporarily selected to obtain a necessary disk space. Further, the file loss caused by a hard disk failure is minimized by providing redundancy on an individual file basis and not on an individual hard disk basis.

11 Claims, 11 Drawing Sheets

STATE PREVAILING AFTER PROCESSING STEP S1

STATE PREVAILING AFTER PROCESSING STEP S2

STATE PREVAILING AFTER PROCESSING STEP S3

RECORDING DEVICE

CLAIM OF PRIORITY

The present application claims priority from Japanese application serial no. JP2004-063397, filed on Mar. 8, 2004, the content of which is hereby incorporated by reference into this application.

BACKGROUND OF THE INVENTION

The present invention relates to a recording device that records a TV broadcast or other video information onto a hard disk or the like.

At present, video recorders are commercialized for use as a recording device for recording images onto a hard disk. These video recorders are used to record TV broadcast images and images taken by a video camera onto a hard disk as digital data. Since digitized images are handled as files on a hard disk, a large number of images can be recorded on a hard disk until its storage limit is reached.

In a method proposed by Patent Document 1 (Japanese Patent Laid-open No. Hei 6-250794), two hard disks can be used in two selectable modes: redundant mode and nonredundant mode. In the redundant mode, the contents of the two hard disks are identical with each other. Therefore, data recordings can be read even when one of the two hard disks becomes faulty. In the nonredundant mode, on the other hand, the two hard disks can be used as separate, independent hard disks.

SUMMARY OF THE INVENTION

In general, digitally recorded data contains an error with a certain probability. If image data is in error, only the erroneous image portion is disordered when it is played back while the other portions within the same file are properly played back. In some cases, the entire file may be unreadable if it contains an error, but the other files, which are without an error, are rarely affected by the error when they are read. However, if the entire hard disk cannot be read due to its defect, no image recordings on the hard disk can be played back.

In the field of computers, a technique called "redundancy" is used to record the same data onto a plurality of hard disks in order to provide against failure. When a redundant hard disk array is used, two or more hard disks contain the same data. Therefore, even if one of the hard disks becomes faulty and inoperative, target data can be read from another hard disk as described in conjunction with Patent Document 1.

However, when a hard disk based video recorder or other similar recording device is used, the length of time during which images can be recorded is limited by the employed hard disk capacity. When the employed hard disk capacity is used up, no more video recordings can be made.

If, for instance, the employed hard disk capacity is used up while a TV broadcast is being recorded by a video recorder, the TV broadcast cannot be fully recorded.

An object of the present invention is to increase the available hard disk space temporarily so as to avoid a recording failure when the capacity of the hard disk employed for a video recorder is used up.

When the capacity of a video recorder or other similar recording device equipped with a redundant hard disk array is used up, the present invention increases the available hard disk space by temporarily placing the hard disk array in the nonredundant mode for the purpose of preventing a recording failure, which might otherwise occur due to disk space insufficiency.

If, for instance, two hard disks are used to provide redundancy, they retain the same video recordings. In this instance, the resulting recording capacity is the same as the recording capacity of a single hard disk. However, when the two hard disks are temporarily placed in the nonredundant mode, the resultant capacity is equivalent to the total capacity of the two hard disks.

The present invention does not place the entire hard disk in the nonredundant mode but applies the nonredundant mode to individual images to be recorded. On the hard disks, images are managed as files. In the redundant mode, the two hard disks contain the same files. If hard disk space insufficiency occurs, the present invention acquires a free disk space by deleting either one of the same files existing on the two hard disks. For confirming redundant files with ease, a redundant flag is furnished to indicate each redundant file.

More specifically, a recording device having a redundancy feature according to the present invention includes first writing means, which writes the same information onto a first recording medium and second recording medium in file form, and second writing means, which does not write information onto the first recording medium but writes information onto the second recording medium. Files recorded on the second recording medium are provided at least with attribute information that indicates whether or not they are recorded in the redundant mode. The attribute information written by the first writing means differs from the attribute information written by the second writing means. In accordance with the free space on the second recording medium, control is exercised to determine whether the first writing means or the second writing means writes information. Control is also exercised in accordance with the attribute information to delete specified file recorded on the second recording medium as needed.

Further, the recording device having the redundancy feature according to the present invention includes the first recording medium and second recording medium, which manage a set of information as a file, the first writing means, which writes the same information onto the first recording medium and second recording medium, and the second writing means, which does not write information onto the first recording medium but writes information onto the second recording medium. Files managed by the second recording medium are provided at least with a redundancy flag, which serves as an attribute or attribute information. When performing a write operation, the first writing means sets the redundancy flag to a true value, which indicates that the redundancy mode is selected. The second writing means performs a write operation while setting the redundancy flag to a false value, which indicates that the nonredundant mode is selected. If the free space on the second recording medium is larger than a specified value, the first writing means writes information. If not, the recording device first deletes files that are recorded on the second recording medium and provided with a true-valued redundancy flag, and then causes the second writing means to record information on the second recording medium.

The recording device according to the present invention also includes a user interface, which can be used to put nonredundant hard disks back in the redundant mode, thereby protecting all files again.

A video recorder or other similar recording device that is provided with hard disks having the redundancy feature according to the present invention further includes receiving means having a programmed recording function and encoding means for encoding a video signal that is output from the receiving means. The size of the file to be written is estimated from the programmed recording time setting for the receiving means and the encoding bit rate setting for the encoding means.

The present invention provides a highly reliable recording device that includes hard disks.

DETAILED DESCRIPTION OF THE PREFERRED EMBODIMENTS

Preferred embodiments of the present invention will now be described with reference to the accompanying drawings.

First Embodiment

A first embodiment of the present invention will now be described with reference to FIGS. 1, 2, 3, 4, 5, and 6.

Figure 1:
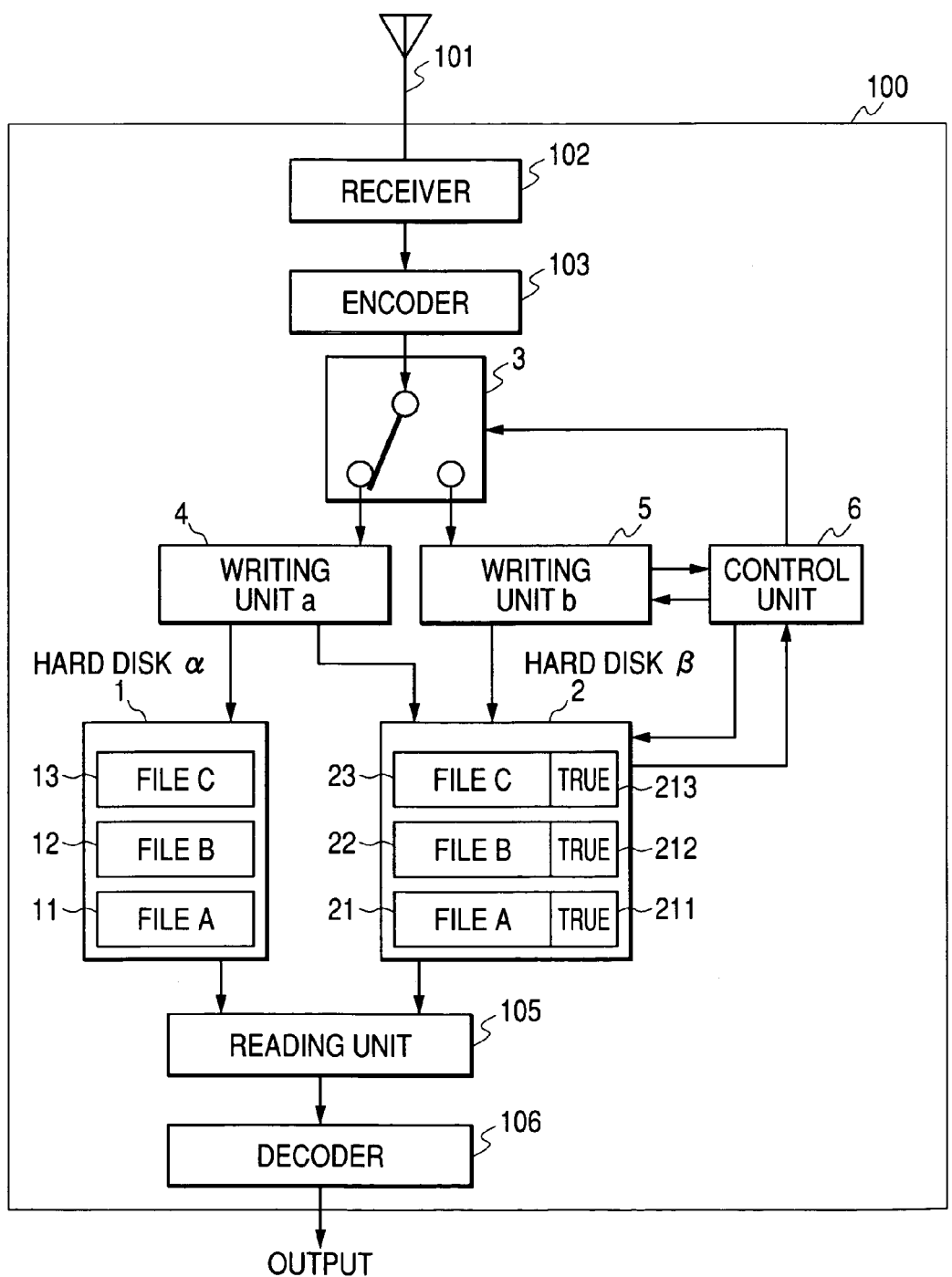
FIG. 1 illustrates the configuration of a first embodiment of a video recorder according to the present invention.
Figure 2:
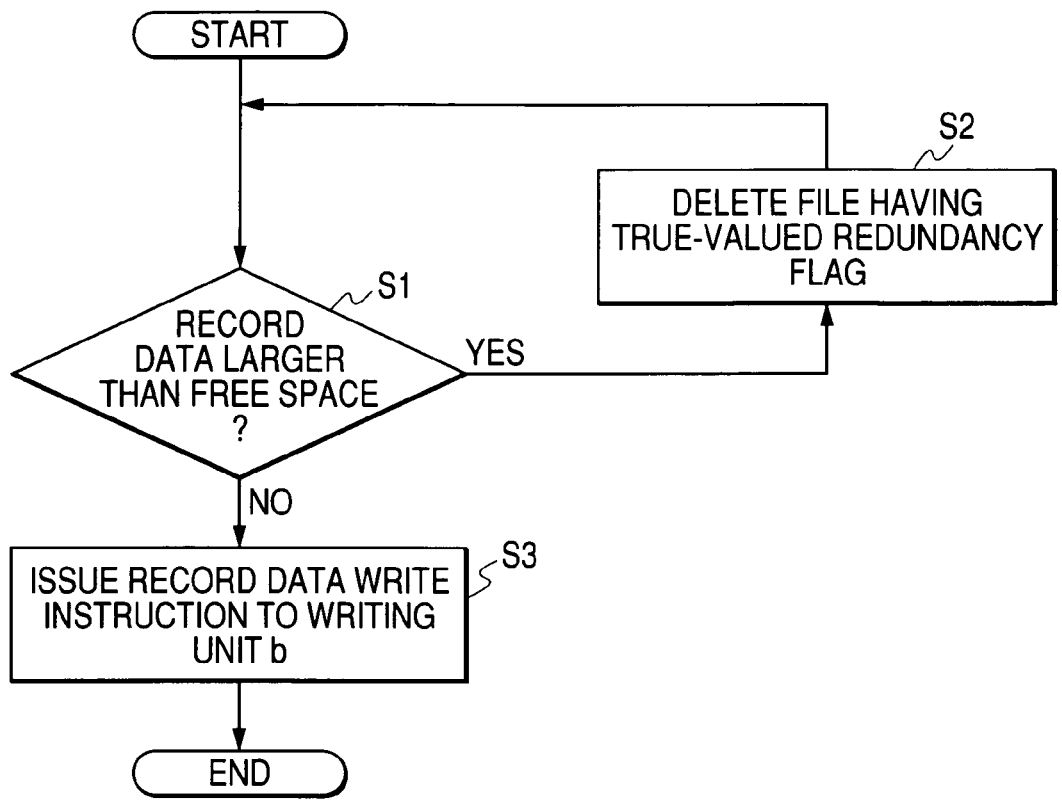
FIG. 2 is a flowchart that illustrates the operating steps performed by control unit, which is an element of the first embodiment.
Figure 3:
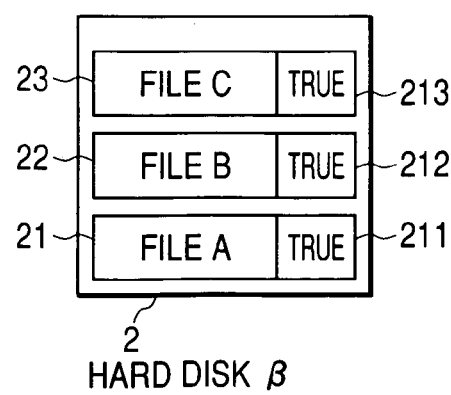
FIG. 3 relates to hard disk β, which is an element of the first embodiment, and illustrates typical contents of the hard disk that prevail subsequently to processing step S1 of the control unit.
Figure 4:
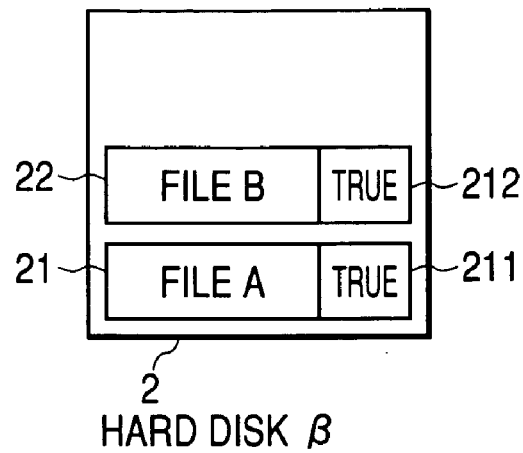
FIG. 4 relates to hard disk β, which is an element of the first embodiment, and illustrates typical contents of the hard disk that prevail subsequently to processing step S2 of the control unit.
Figure 5:
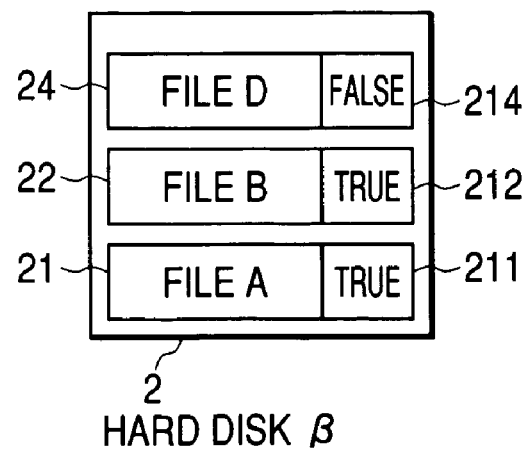
FIG. 5 relates to hard disk β, which is an element of the first embodiment, and illustrates typical contents of the hard disk that prevail subsequently to processing step S3 of the control unit.
Figure 6:
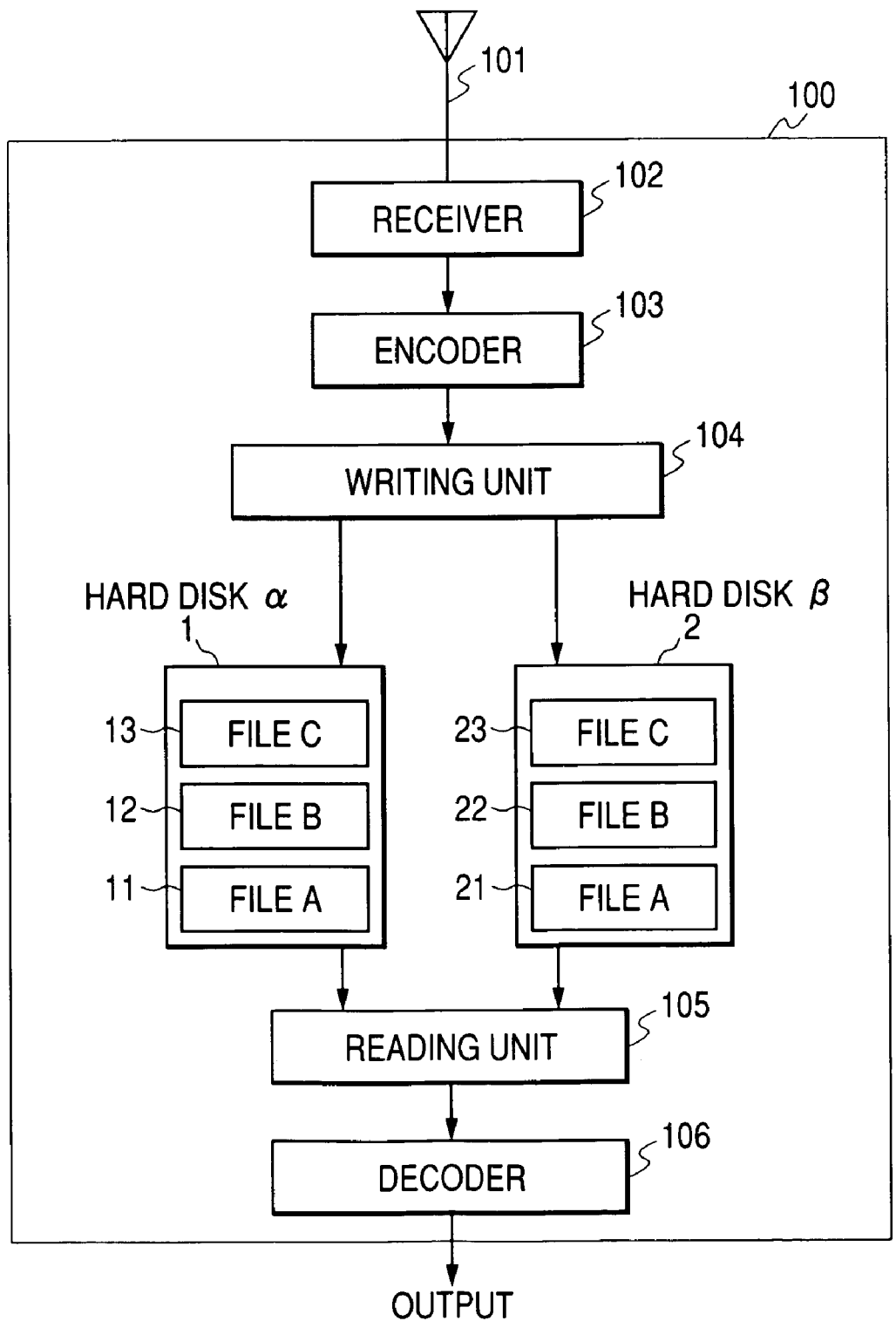
FIG. 6 illustrates the configuration of a video recorder having common redundant hard disks.

FIG. 1 illustrates the configuration of the first embodiment of a video recorder according to the present invention. FIG. 2 is a flowchart illustrating the write operation steps that are performed by the video recorder. FIG. 3 relates to hard disk β in the video recorder, and illustrates the contents of the hard disk that prevail subsequently to processing step S1 in the flowchart. FIG. 4 relates to hard disk β in the video recorder, and illustrates the contents of the hard disk that prevail subsequently to processing step S2 in the flowchart. FIG. 5 relates to hard disk β in the video recorder, and illustrates the contents of the hard disk that prevail subsequently to processing step S3 in the flowchart. FIG. 6 shows a typical configuration of a conventional video recorder.

FIG. 1 shows the configuration of one embodiment of a video recorder according to the present invention. The reference numeral 100 denotes a video recorder; 101, an antenna; 102, a receiver: 103, an encoder; 105, reading unit; 106, a decoder; 1, a first hard disk for video recording or hard disk α; 11, video data file A that is recorded on hard disk α 1; 12, video data file B that is recorded on hard disk α 1; 13, video data file C that is recorded on hard disk α 1; 2, a second hard disk for video recording or hard disk β; 21, video data file A that is recorded on hard disk β 2; 22, video data file B that is recorded on hard disk β 2; 23, video data file C that is recorded on hard disk β 2; 211, a redundancy flag for file A 21 (flag for indicating whether the file is redundant); 212, a redundancy flag for file B 22; 213, a redundancy flag for file C 23; 6, control unit; 4, writing unit a which writes video data onto hard disk α 1 and hard disk β 2; 5, writing unit b which writes video data onto hard disk β 2; and 3, a selector switch. The capacity of hard disk α 1 is equal to that of hard disk β 2.

FIG. 2 shows operating steps that are performed by the control unit 6. Step S1 is a conditional branch process. Step S2 is a file deletion process. Step S3 is a data write process.

FIG. 3 shows typical contents of hard disk β that prevail subsequently to processing step S1. The reference numeral 21 denotes file A; 22, file B; 23, file C; 211, a redundancy flag for file A 21; 212, a redundancy flag for file B 22; and 213, a redundancy flag for file C 23.

FIG. 4 shows typical contents of hard disk β that prevail subsequently to processing step S2. The reference numeral 21 denotes file A; 22, file B; 211, a redundancy flag for file A 21; and 212, a redundancy flag for file B 22.

FIG. 5 shows typical contents of hard disk β that prevail subsequently to processing step S3. The reference numeral 21 denotes file A; 22, file B; 24, file D; 211, a redundancy flag for file A 21; 212, a redundancy flag for file B 22; and 214, a redundancy flag for file D 24.

FIG. 6 shows the configuration of a video recorder having common redundant hard disks. The reference numeral 100 denotes a video recorder; 101, an antenna; 102, a receiver; 103, an encoder; 105, reading unit; 106, a decoder; 1, a first hard disk for video recording or hard disk α; 11, video data file A that is recorded on hard disk α 1; 12, video data file B that is recorded on hard disk α 1; 13, video data file C that is recorded on hard disk α 1; 2, a second hard disk for video recording or hard disk β; 21, video data file A that is recorded on hard disk β 2; 22, video data file B that is recorded on hard disk β 2; 23, video data file C that is recorded on hard disk β 2; and 104, writing unit for writing data onto hard disk α 1 and hard disk β 2.

The operation of the video recorder having common redundant hard disks will now be described with reference to FIG. 6.

The antenna 101 receives a TV broadcast signal. The receiver 102 demodulates the received signal to obtain a video signal. The video signal derived from demodulation is encoded by the encoder 103 to obtain record data for each size.

The encoder 103 sequentially feeds the record data to the writing unit 104. The writing unit 104 writes the record data onto hard disk α 1 and hard disk β 2. As a result, the same files are generated on hard disk α 1 and hard disk β 2. File A 11 on hard disk α 1 and file A 21 on hard disk β 2 are written onto the hard disks by the above method and equal in contents. Similarly, file B 12 on hard disk α 1 and file B 22 on hard disk β 2 have the same contents, and file C 13 on hard disk α 1 and file C 23 on hard disk β 2 have the same contents.

When the user issues instructions for video playback, the reading unit 105 reads record data from specified video files on hard disk α 1 or hard disk β 2, and sequentially feeds them to the decoder 106. The decoder 106 demodulates the record data to obtain a video signal and outputs the obtained video signal.

If hard disk α 1 or hard disk β 2 becomes faulty so that a target file cannot be read, the reading unit 105 can read the same file from a normally operating hard disk.

The operation of a video recorder according to the present invention will now be described with reference to FIGS. 1, 2, 3, 4, and 5.

The antenna 101 shown in FIG. 1 receives a TV broadcast signal. The receiver 102 demodulates the received signal to obtain a video signal. The video signal derived from demodulation is encoded by the encoder 103 to obtain record data for each size. Although the present embodiment receives a TV broadcast as an input into the video recorder, the prevent invention is not limited to such a TV broadcast input into the video recorder.

The encoder 103 sequentially feeds the record data to the selector switch 3. Since the selector switch 3 is normally set to writing unit a 4, the record data fed from the encoder 103 is forwarded to writing unit a 4. Writing unit a 4 writes the record data to hard disk α 1 and hard disk β 2, and sets a true-valued redundancy flag for files written onto hard disk β 2.

File A 11 on hard disk α 1 and file A 21 on hard disk β 2 are written onto the hard disks by the above method and identical with each other. File B 12 on hard disk α 1 is identical with file B 22 on hard disk β 2. File C 13 on hard disk α 1 is identical with file C 23 on hard disk β 2. The redundancy flag 211 for file A 11, the redundancy flag 212 for file B 12, and the redundancy flag 213 for file C 13 are set to a true value.

If, as a result of the above write operation, hard disk β 2 is used up or its free space is smaller than a predefined threshold value, the control unit 6 makes a switch with the selector switch 3 so that the record data encoded by the encoder 103 is subsequently is conveyed to writing unit b 5. Writing unit b 5 informs the control unit 6 of the size of the conveyed record data. When the control unit 6 issues a write instruction, the writing unit b 5 writes the record data onto hard disk β 2, and sets a false-valued redundancy flag for added files in which the record data is written. Any true/false value expression may be employed as far as it indicates whether the files are redundant.

The control unit 6 operates as indicated in the flowchart shown in FIG. 2. First of all, processing step S1 is performed to compare the free space of hard disk β 2 against the size of the data to be recorded. If the size of the data to be recorded is larger than the free space, the program flow branches to processing step S2. If, on the other hand, the size of the data to be recorded is not larger than the free space, the program flow branches to processing step S3. FIG. 3 shows typical contents of hard disk β 2 that prevail subsequently to processing step S1. In FIG. 3, file A 21, file B 22, and file C 23 written by writing unit a 4 are located on hard disk β 2 and set to a true-valued redundancy flag.

Processing step S2 is performed to delete files that are recorded on hard disk β 2 and provided with a true-valued redundancy flag. After deletion of such files, the program flow returns to processing step S1. FIG. 4 shows typical contents of hard disk β 2 that prevail after completion of processing step S2. In FIG. 4, file C 23 is deleted. As a result, the free space on hard disk β 2 increases by the size of file C 23. When the resulting free space is larger than the record data size, the program flow proceeds to processing step S3. If the free space on hard disk β 2 is not sufficient, the program flow proceeds to processing step S2 and deletes another file.

In processing step S3, a write instruction is issued to writing unit b 5. Writing unit b 5 writes the record data onto hard disk β 2 and sets a false-valued redundancy flag for the written file. FIG. 5 shows typical contents of hard disk β 2 that prevail after completion of processing step S3. FIG. 5 indicates that file A 21, file B 22, and file D 24 are stored on hard disk β 2. A true-valued redundancy flag is set for file A 21 and file B 22, whereas a false-valued redundancy flag is set for file D 24.

File A 21 and file B 22 have been stored on hard disk β 2 before the operation of writing unit b 5, and files identical with these files are stored on hard disk α 1. File D 24 is written by writing unit b 5 and not found on hard disk α 1.

When the user issues instructions for video playback, the reading unit 105 reads record data from specified video files on hard disk α 1 or hard disk β 2, and sequentially feeds them to the decoder 106. The decoder 106 demodulates the record data to obtain a video signal and outputs the obtained video signal.

If hard disk α 1 becomes faulty in the above instance, file C cannot be read; however, files A, B, and D can be read from hard disk β 2. If, on the other hand, hard disk β 2 becomes faulty, file D cannot be read; however, files A, B, and C can be read from hard disk α 1.

It is necessary that the file to be deleted in processing step S2 above have a true-valued redundancy flag. However, if two or more files meet such criteria, the file to be deleted may be selected while considering conditions (a) through (c) below:

(a) Deleting the Largest File

When the largest file is first deleted, the number of deletion processes to be performed to obtain a necessary free space can be reduced.

(b) Deleting a File Having the Most Recent Timestamp

It is probable that files having an early timestamp may be retained in the video recorder for repetitive viewing by the user. If a file having the most recent timestamp is first deleted, files having such an early timestamp can be kept in the redundant mode for a relatively long period of time.

(c) Deleting a Read File

When video files recorded in the video recorder are viewed once or twice, they become unnecessary depending on the user's usage patterns. When the video files are used in such a manner, it is conceivable that viewed files may not be important. When viewed files are first deleted, unviewed files can be kept in the redundant mode for a relatively long period of time.

Second Embodiment

A second embodiment of the present invention will now be described with reference to FIGS. 7 and 8.

Figure 7:
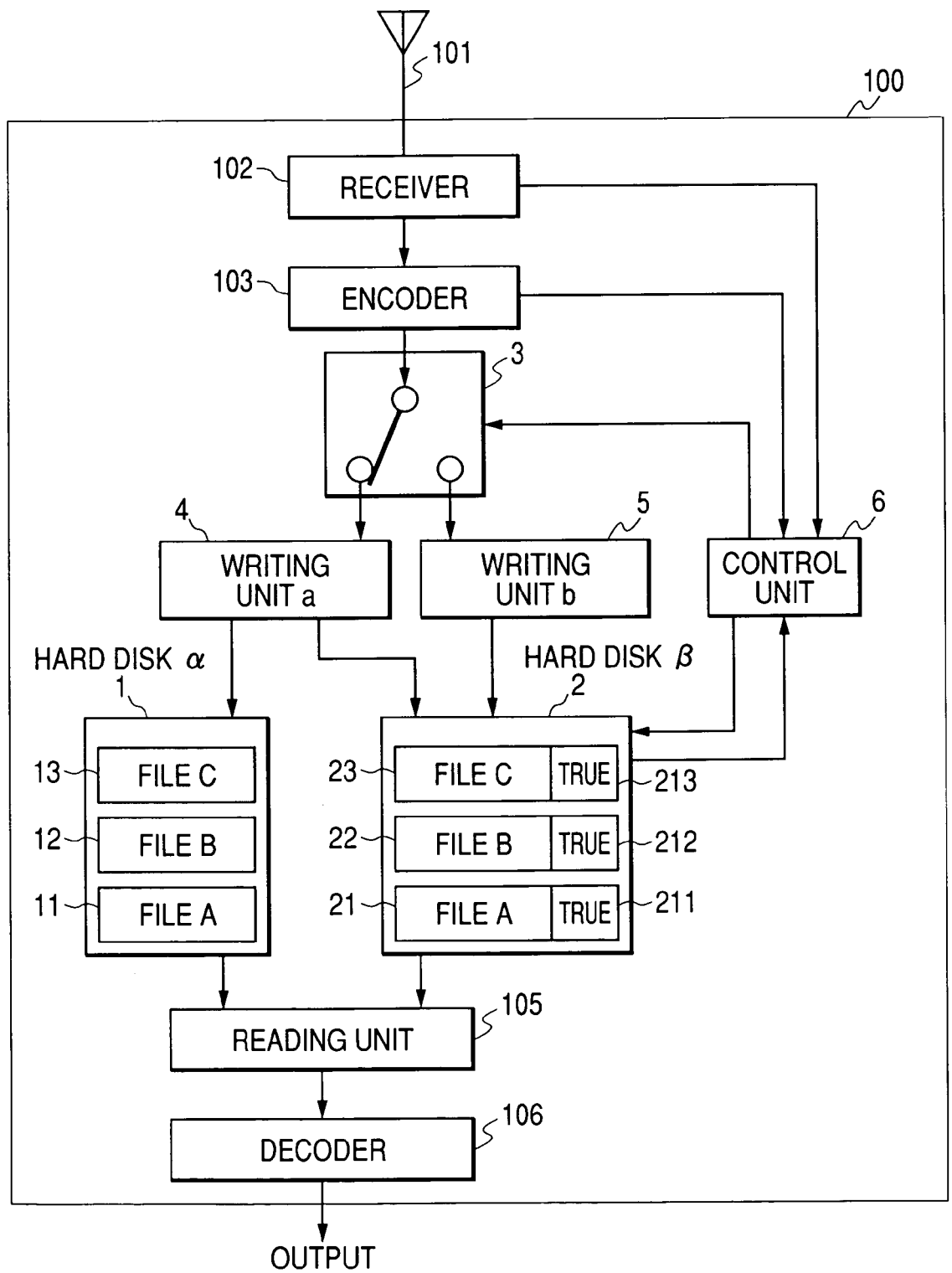
FIG. 7 illustrates the configuration of a second embodiment of a video recorder according to the present invention.

FIG. 7 illustrates the configuration of the second embodiment of a video recorder according to the present invention. The reference numeral 100 denotes a video recorder; 101, an antenna; 102, a receiver; 103, an encoder; 105, reading unit; 106, a decoder; 1, a first hard disk for video recording or hard disk α; 11, video data file A that is recorded on hard disk α 1; 12, video data file B that is recorded on hard disk α 1; 13, video data file C that is recorded on hard disk α 1; 2, a second hard disk for video recording or hard disk β; 21, video data file A that is recorded on hard disk β 2; 22, video data file B that is recorded on hard disk β 2; 23, video data file C that is recorded on hard disk β 2; 211, a redundancy flag for file A 21; 212, a redundancy flag for file B 22; 213, a redundancy flag for file C 23; 6, control unit; 4, writing unit a which writes video data onto hard disk α 1 and hard disk β 2; 5, writing unit b which writes video data onto hard disk β 2; and 3, a selector switch. The capacity of hard disk α 1 is equal to that of hard disk β 2.

Figure 8:
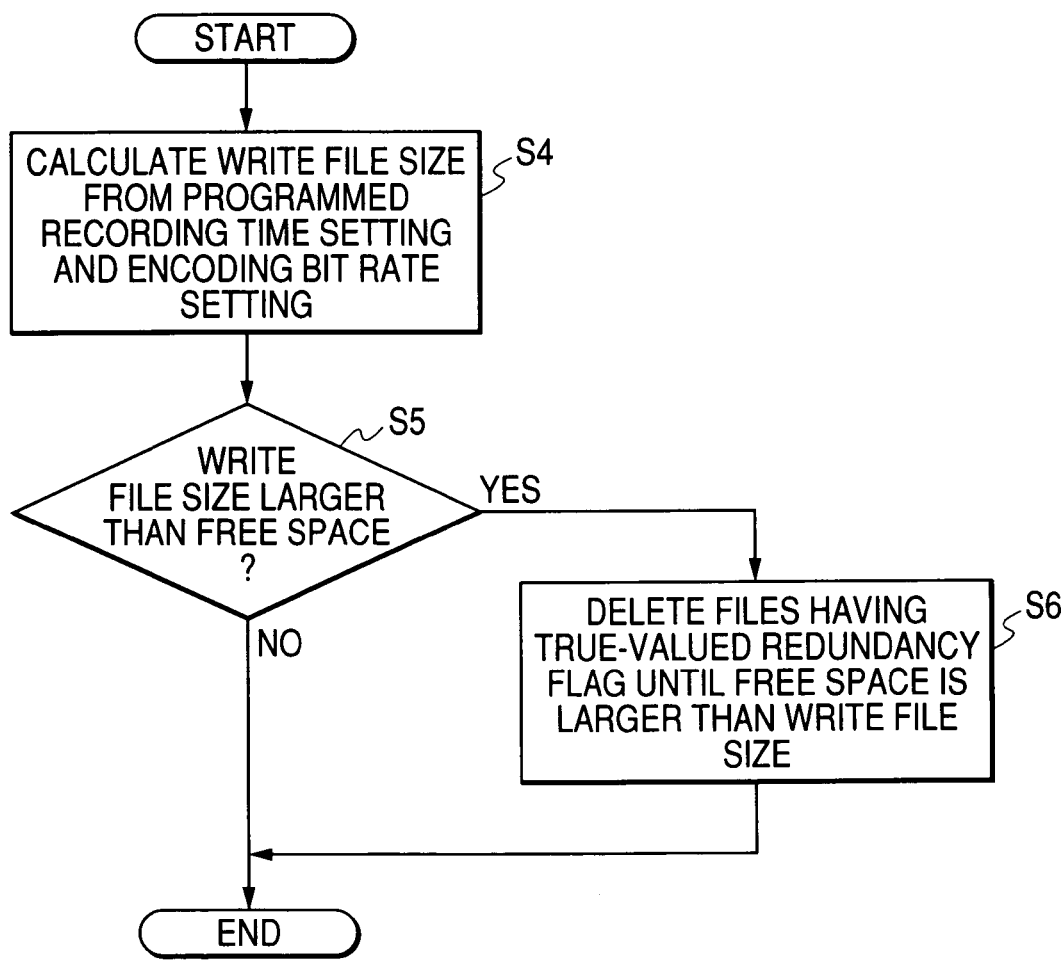
FIG. 8 is a flowchart that illustrates the operating steps performed by control unit, which is an element of the second embodiment.

FIG. 8 shows operating steps that are performed by the control unit 6. Step S4 is a calculation process. Step S5 is a conditional branch process. Step S6 is a file deletion process.

The operation of the second embodiment according to the present invention will now be described with reference to FIG. 7. The present embodiment is useful when the video recorder is used for programmed recording. The receiver 102 starts operating at a programmed time and demodulates a TV broadcast signal, which is received by the antenna 101, to obtain a video signal. The video signal derived from demodulation is then encoded by the encoder 103 to obtain record data for each size.

The control unit 6 operates before the programmed time for the receiver 102 and sets the selector switch 3 to writing unit a 4 or writing unit b 5. If the selector switch 3 is set to writing unit a 4, the record data encoded by the encoder 103 is written onto hard disk α 1 and hard disk β 2 in the same manner as described in conjunction with the first embodiment. If, on the other hand, the selector switch 3 is set to writing unit b 5, writing unit b 5 writes the received record data onto hard disk β 2 and sets a false-valued redundancy flag for added files in which the record data is written. Further, if the user issues instructions for video playback, a video signal output is generated by performing the same operation as described in conjunction with the first embodiment.

The operation of the control unit 6 will now be described with reference to FIG. 8. The control unit 6 operates before the programmed time for the receiver 102. Processing step S4 is first performed to calculate the size of the file to be written for programmed recording (hereinafter referred to as the write file size) from the programmed time setting for the receiver 102 and encoding bit rate setting for the encoder 103. Next, processing step S5 is performed to compare the free space on hard disk β 2 against the write file size. If the write file size is larger than the free space on the hard disk, the program flow branches to processing step S6. If, on the other hand, the write file size is smaller than the free space on the hard disk, the process terminates. In processing step S6, files having a true-valued redundancy flag are deleted as needed until the free space on hard disk β 2 is larger than the write file size. As a result of the above process, the free space on hard disk β 2 is more than adequate for programmed recording at the beginning of a programmed recording operation. This makes it possible to prevent a programmed recording failure that may arise out of insufficient free disk space.

Third Embodiment

Figure 9:
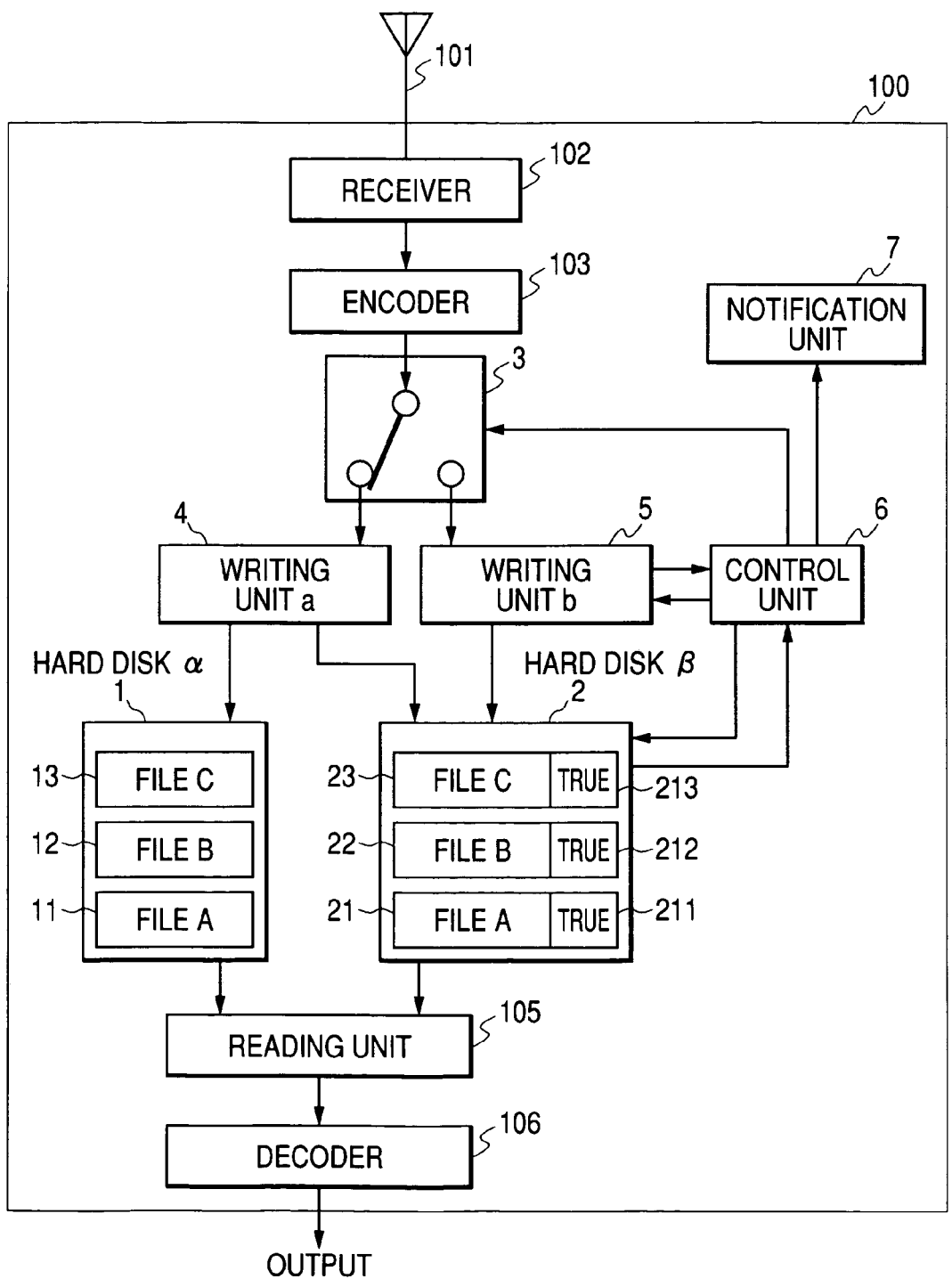
FIG. 9 illustrates the configuration of a third embodiment of a video recorder according to the present invention.

A third embodiment of the present invention will now be described with reference to FIG. 9.

The present embodiment is obtained by adding notification unit to the first embodiment. FIG. 9 shows the configuration of the third embodiment of a video recorder according to the present invention. The reference numeral 100 denotes a video recorder; 101, an antenna; 102, a receiver; 103, an encoder; 105, reading unit; 106, a decoder; 1, a first hard disk for video recording or hard disk α; 11, video data file A that is recorded on hard disk α 1; 12, video data file B that is recorded on hard disk α 1; 13, video data file C that is recorded on hard disk α 1; 2, a second hard disk for video recording or hard disk β; 21, video data file A that is recorded on hard disk β 2; 22, video data file B that is recorded on hard disk β 2; 23, video data file C that is recorded on hard disk β 2; 211, a redundancy flag for file A 21; 212, a redundancy flag for file B 22; 213, a redundancy flag for file C 23; 6, control unit; 4, writing unit a which writes video data onto hard disk α 1 and hard disk β 2; 5, writing unit b which writes video data onto hard disk β 2; 3, a selector switch; and 7, notification unit for sending a notification to the user.

The operation of the third embodiment according to the present invention will now be described with reference to FIG. 9. The present embodiment is characterized by the fact that a notification instruction is issued to the notification unit 7 when the control unit 6 sets the selector switch 3 to writing unit b 5. All the other operating steps are the same as described in conjunction with the first embodiment.

Upon receipt of the notification instruction from the control unit 6, the notification unit 7 notifies the user that the nonredundant mode is selected. The notification unit 7 may be implemented as a text/image display device, a warning lamp, an alarm buzzer, an e-mail transmitter, or a combination of these.

Upon receipt of a notification from the notification unit 7, the user knows that the video recorder 100 is placed in the nonredundant mode, and can back up files existing on a hard disk or take other necessary action.

Even when the notification unit is added to the second embodiment of the present invention, the second embodiment can perform the same operation as described above.

Fourth Embodiment

A fourth embodiment of the present invention will now be described with reference to FIGS. 10, 11, 12, 13, and 14.

Figure 10:
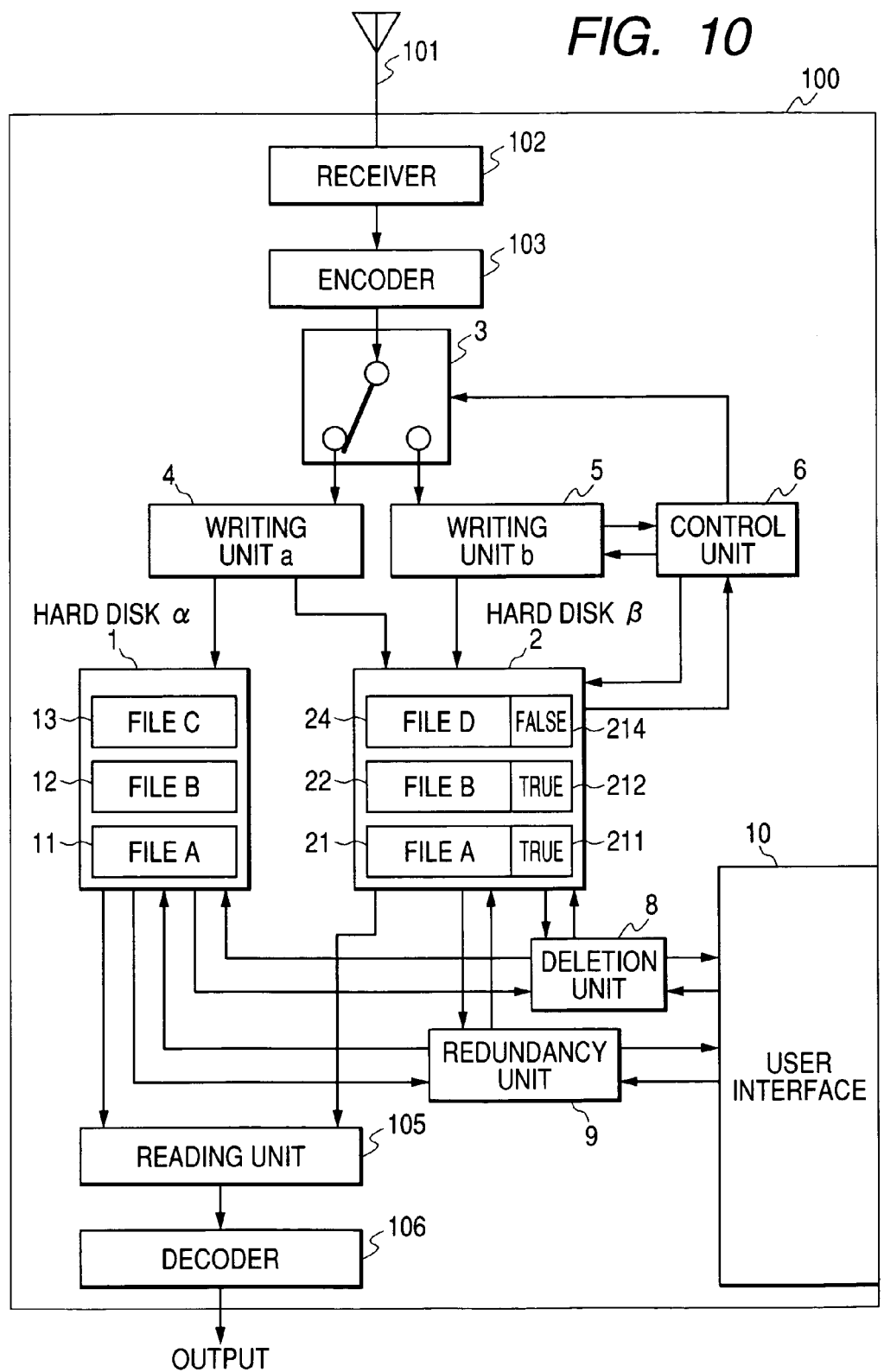
FIG. 10 illustrates the configuration of a fourth embodiment of a video recorder according to the present invention.

FIG. 10 shows the configuration of the fourth embodiment of a video recorder according to the present invention. The reference numeral 100 denotes a video recorder; 101, an antenna; 102, a receiver; 103, an encoder; 105, reading unit; 106, a decoder; 1, a first hard disk for video recording or hard disk α; 11, video data file A that is recorded on hard disk α 1; 12, video data file B that is recorded on hard disk α 1; 13, video data file C that is recorded on hard disk α 1; 2, a second hard disk for video recording or hard disk β; 21, video data file A that is recorded on hard disk β 2; 22, video data file B that is recorded on hard disk β 2; 24, video data file D that is recorded on hard disk β 2; 211, a redundancy flag for file A 21; 212, a redundancy flag for file B 22; 214, a redundancy flag for file D 24; 6, control unit; 4, writing unit a which writes video data onto hard disk α 1 and hard disk β 2; 5, writing unit b which writes video data onto hard disk β 2; 3, a selector switch; 8, deletion unit; 9, redundancy unit; and 10, a user interface. The capacity of hard disk α 1 is equal to that of hard disk β 2.

Figure 11:
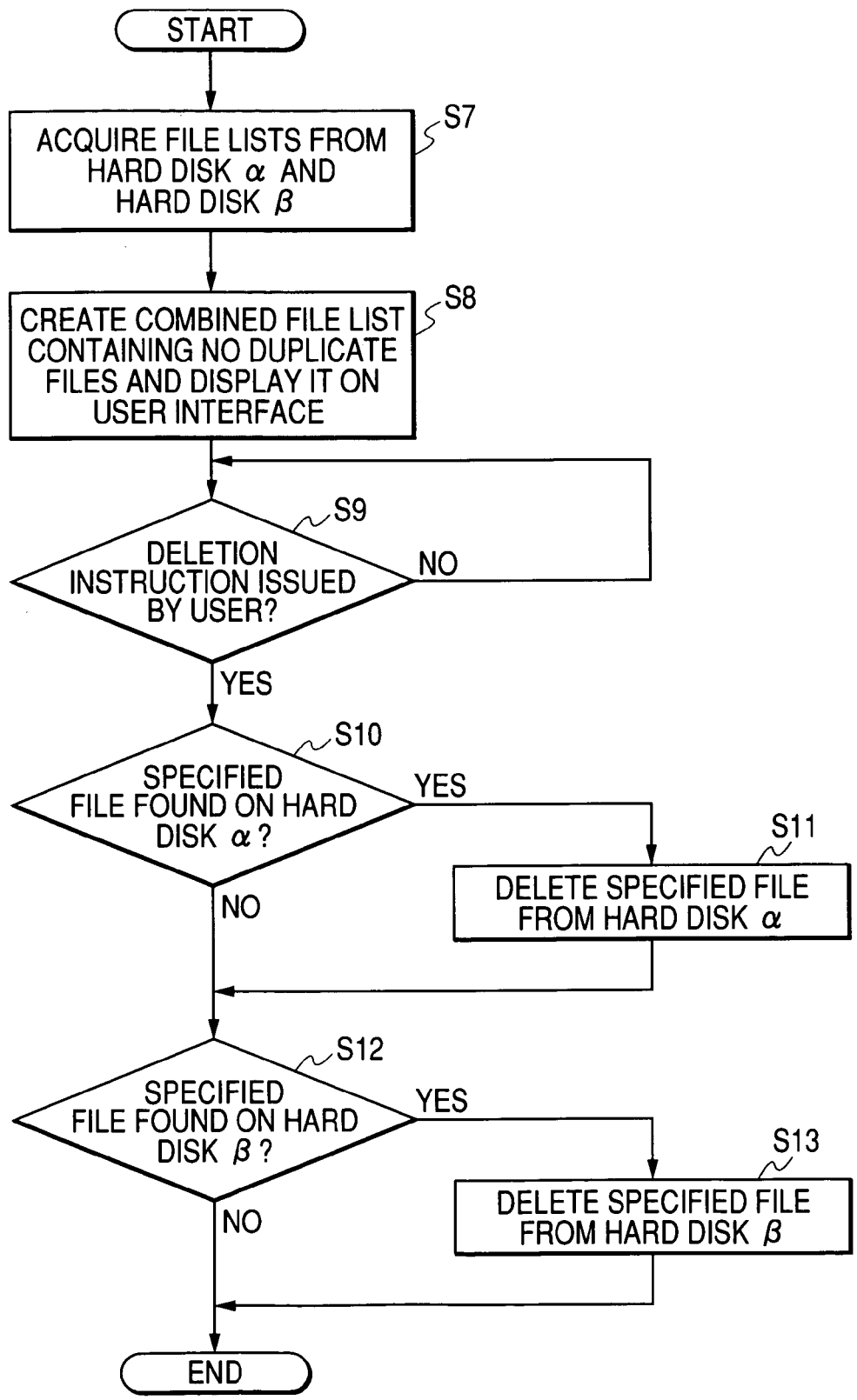
FIG. 11 is a flowchart that illustrates the operating steps performed by deletion unit, which is an element of the fourth embodiment.

FIG. 11 shows operating steps that are performed by the deletion unit 8. Step S7 is a file list acquisition process. Step S8 is a display process. Step S9 is a conditional branch process. Step S10 is a conditional branch process. Step S11 is a deletion process. Step S12 is a conditional branch process. Step S13 is a deletion process.

Figure 12:
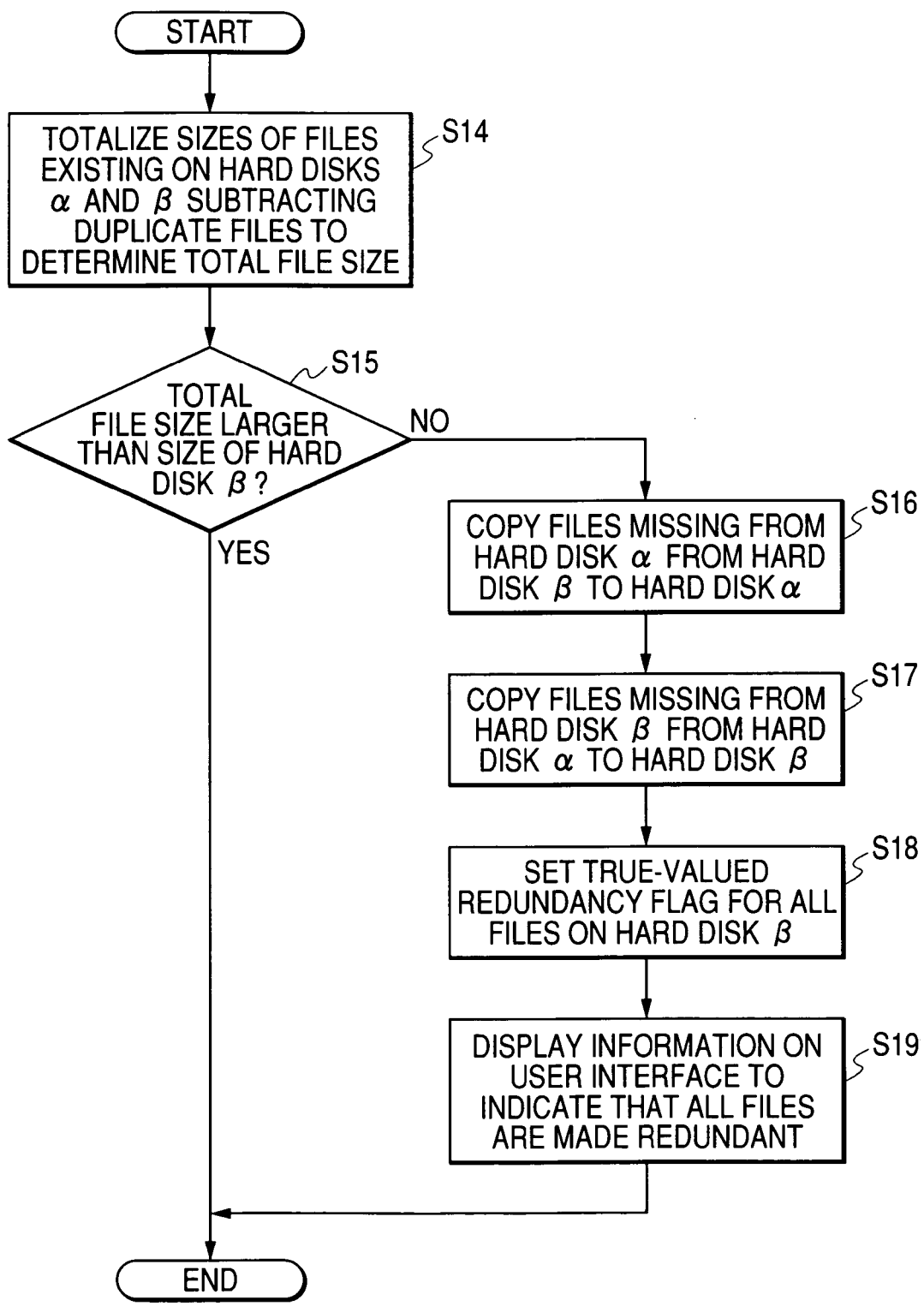
FIG. 12 is a flowchart that illustrates the operating steps performed by redundant unit, which is an element of the fourth embodiment.

FIG. 12 shows operating steps that are performed by the redundancy unit 9. Step S14 is a file size calculation process. Step S15 is a conditional branch process. Step S16 is a copy process. Step S17 is a copy process. Step S18 is a flag setup process. Step S19 is a display process.

Figure 13:
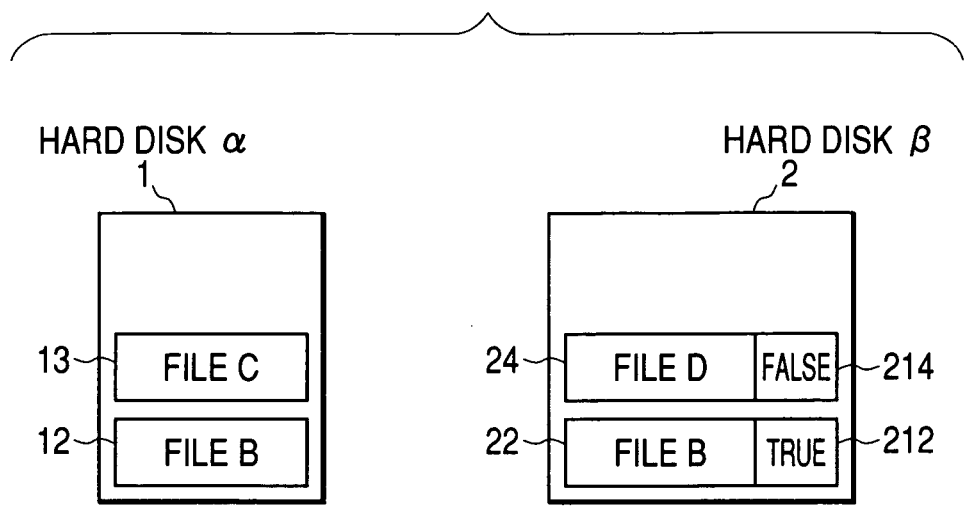
FIG. 13 relates to hard disks α and β, which are elements of the fourth embodiment, and illustrates typical contents of the hard disks that prevail subsequently to a process performed by the deletion unit.

FIG. 13 shows typical contents of hard disk α 1 and hard disk β 2 that prevail after a process is performed by the deletion unit 8. The reference numeral 1 denotes hard disk α; 12, file B; 13, file C; 2, hard disk β; 22, file B; 24, file D; 212, a redundancy flag for file B 22; and 214, a redundancy flag for file D.

Figure 14:
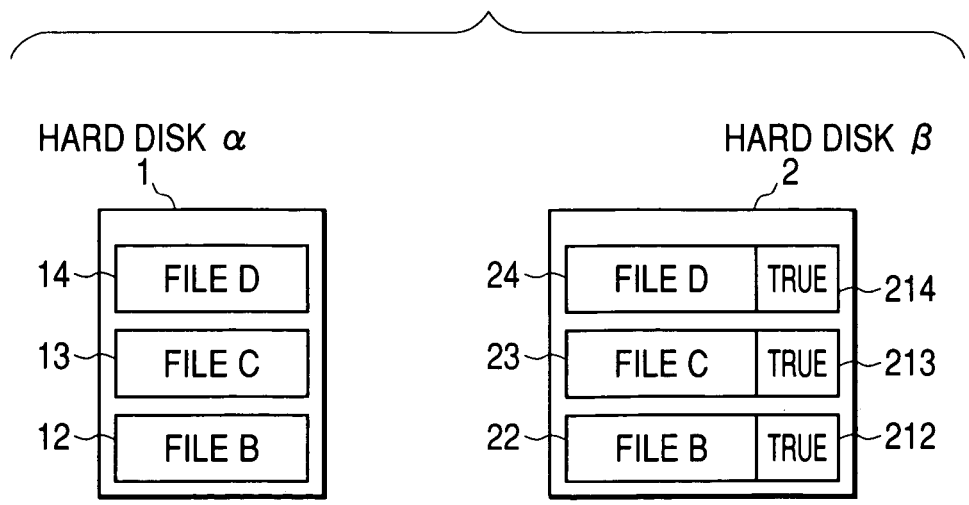
FIG. 14 relates to hard disks α and β, which are elements of the fourth embodiment, and illustrates typical contents of the hard disks that prevail subsequently to a process performed by the redundant unit.

FIG. 14 shows typical contents of hard disk α 1 and hard disk β 2 that prevail after a process is performed by the redundancy unit 9. The reference numeral 1 denotes hard disk α; 12, file B; 13, file C; 14, file D; 2, hard disk β; 22, file B; 23, file C; 24, file D; 212, a redundancy flag for file B 22; 213, a redundancy flag for file C 23; and 214, a redundancy flag for file D 24.

The operation of the fourth embodiment according to the present invention will now be described with reference to FIG. 10.

The present embodiment is similar to the first embodiment except that an additional operating sequence is performed to put nonredundant files back in the redundant mode. The video recording and video reading sequences are the same as those of the first embodiment. The operating sequence for placing files back in the redundant mode starts when a file deletion start instruction is issued. First of all, the deletion unit 8 deletes one or more files on a hard disk. When a specified free hard disk space is made available by file deletion, the redundancy unit 9 copies one or more files between hard disk α 1 and hard disk β 2 and places the files in the redundant mode.

The operation of the deletion unit 8 will now be described with reference to FIG. 11. Upon receipt of a file deletion start instruction from the user, the deletion unit 8 performs processing step S7 to acquire a file list of hard disk α 1 and a file list of hard disk β 2. In processing step S8, the deletion unit 8 combines the two lists to generate a new list from which duplicates are deleted, and displays the resulting combined list on the user interface. In processing step S9, the deletion unit 8 waits for the user to issue a file deletion instruction.

In processing step S10, the deletion unit 8 checks whether a user-specified file exists on hard disk α 1. If the specified file is found, the deletion unit 8 deletes it in processing step S11. If the file specified in processing step S10 is not found, the deletion unit 8 proceeds to processing step S12. In processing step S12, the deletion unit 8 checks whether the user-specified file exists on hard disk β 2. If the specified file is found, the deletion unit 8 deletes it in processing step S13 and then terminates the process. If the file specified in processing step S10 is not found, the deletion unit 8 terminates the process.

When the above operation is performed, the user-specified file is deleted from hard disk α 1 and hard disk β 2. FIG. 13 shows the contents of hard disk α 1 and hard disk β 2 that prevail after the above process is completed in a situation where the contents of hard disk α 1 and hard disk β 2 are as indicated in FIG. 10 and deletion of file A is specified by the user. In FIG. 13, file A 11 on hard disk α 1 and file A 21 on hard disk β 2 are deleted.

The operation of the redundancy unit 9 will now be described with reference to FIG. 12. When file deletion is accomplished by the deletion unit 8, the redundancy unit 9 starts its process. In processing step S14, the redundancy unit 9 first subtracts the size of duplicate files from the sum of the sizes of the files existing on hard disk α 1 and hard disk β 2, and regards the resulting file size as the total file size. In the example shown in FIG. 13, the total file size is obtained by adding the sizes of file B 12, file C 13, and file D 24 together.

Next, the redundancy unit 9 performs processing step S15 to compare the total file size against the capacity of hard disk β 2. If the total file size is larger than the capacity of hard disk β 2, the process terminates. If, on the other hand, the capacity of hard disk β 2 is larger than the total file size, the redundancy unit 9 proceeds to processing step S16, in which files missing in hard disk α 1 are copied from hard disk β 2 to hard disk α 1. In the example shown in FIG. 13, file D is copied to hard disk α 1.

In processing step S17, files missing in hard disk β 2 are copied from hard disk α 1 to hard disk β 2. In the example shown in FIG. 13, file C is copied to hard disk β 2.

In processing step S18, a true-valued redundancy flag is set for all the files on hard disk β 2. In processing step S19, the user interface displays information to indicate that all files are now placed in the redundant mode, and then the process terminates.

FIG. 14 shows the contents of hard disk α 1 and hard disk β 2 that prevail after the above process is completed in a situation where the contents of hard disk α 1 and hard disk β 2 are as indicated in FIG. 13. In FIG. 14, all the files existing on hard disk α 1 are identical with those existing on hard disk β 2 and a true-valued redundancy flag is set for the files on hard disk β 2.

When the above operation is performed, the present embodiment places the nonredundant hard disks in the video recorder back in the redundant mode.

In the first to fourth embodiments, which have been described above, the redundancy flags are stored on the hard disks. Alternatively, however, the redundancy flags may be stored in different storage unit. If such alternative storage unit is used, the association between the redundancy flags and the files on the hard disks needs to be clearly defined.

The present invention can also be applied to a video recorder containing a storage device other than a hard disk as far as the storage device is rendered redundant.

What is claimed is:
1. A recording device comprising:
a first writing unit, which writes the same information onto a first recording medium and a second recording medium in file form; and
a second writing unit, which does not write information onto said first recording medium but writes information onto said second recording medium;

wherein:

at least files recorded on the second recording medium are provided with attribute information for indicating whether or not the recorded files are redundant; and said first writing unit and said second writing unit use different attribute information during a write operation, exercise control to determine, in accordance with the free space on said second recording medium, whether said first writing unit or said second writing unit should be used for writing information, and exercise control to delete a specified file recorded on said second recording medium in accordance with said attribute information.

2. A recording device comprising:

a first writing unit, which writes the same information onto a first recording medium and a second recording medium in file form; and a second writing unit, which does not write information onto said first recording medium but writes information onto said second recording medium;

wherein:

at least files written on the second recording medium are provided with a redundancy flag as an attribute for indicating whether the written files are redundant;

said first writing unit sets a true-valued redundancy flag during a write operation to indicate redundancy;

said second writing unit sets a false-valued redundancy flag during a write operation to indicate nonredundancy; and if the free space on said second recording medium is larger than a specified value, said first writing unit writes information, and if the free space on said second recording medium is not larger than the specified value, said second writing unit records information onto the second recording medium after deleting files that are recorded on the second recording medium and provided with a true-valued redundancy flag.

3. The recording device according to claim 2, further comprising:

a deletion unit which deletes files recorded on said first recording medium and said second recording medium;

a redundancy unit which copies files recorded on said first recording medium and said second recording medium between said first recording medium and said second recording medium; and a user interface;

wherein:

said deletion unit deletes a file that is specified by the user via the user interface; and said redundancy unit copies files missing in the second recording medium from the first recording medium to the second recording medium, copies files missing in the first recording medium from the second recording medium to the first recording medium, and sets a true-valued redundancy flag for all the files to place the first recording medium and the second recording medium in the redundant mode.

4. A recording device comprising:

a first recording medium and a second recording medium, which manage information in file form;

a first writing unit, which writes the same information onto said first recording medium and said second recording medium;

a second writing unit, which does not write information onto said first recording medium but writes information onto said second recording medium;

a switching unit which switches between said first writing unit and said second writing unit; and a control unit which controls said switching unit;

wherein:

at least files managed by the second recording medium are provided with a redundancy flag as an attribute for indicating whether the files are redundant;

said first writing unit sets a true-valued redundancy flag during a write operation to indicate redundancy;

said second writing unit sets a false-valued redundancy flag during a write operation to indicate nonredundancy;

if the free space on said second recording medium is larger than a specified value, said control unit sets said switching unit to the first writing unit, and if the free space on said second recording medium is not larger than the specified value, said control unit sets said switching unit to the second writing unit and writes information onto the second recording medium after deleting files that are recorded on the second recording medium and provided with a true-valued redundancy flag.

5. The recording device according to claim 4, wherein, when said second writing unit writes information, said control unit deletes files recorded on said second recording medium until the free space on the second recording medium is larger than the size of the information.

6. The recording device according to claim 4, wherein said control unit estimates the size of a new file before the new file is to be written, deletes one or more files recorded on said second recording medium until the free space on the second recording medium is larger than said estimated size.

7. The recording device according to claim 4, wherein said control unit preferentially deletes the largest file that is recorded on said second recording medium and provided with a true-valued redundancy flag.

8. The recording device according to claim 4, wherein said control unit preferentially deletes a file that is recorded on said second recording medium, provided with a true-valued redundancy flag, and marked with the most recent timestamp.

9. The recording device according to claim 4, wherein said control unit preferentially deletes a previously read file that is recorded on said second recording medium and provided with a true-valued redundancy flag.

10. The recording device according to claim 4, further comprising a notification unit which notifies the user that the nonredundant mode is selected, wherein said notification unit sends a notification to the user when said control unit sets said switching unit to the second writing unit.

11. The recording device according to claim 6, further comprising:

a receiving unit having a programmed recording function; and an encoding unit which encodes a video signal that is output from said receiving unit;

wherein the size of the file to be written is estimated from the programmed recording time setting for said receiving unit and the encoding bit rate setting for said encoding unit.

* * * * *